US011059597B2

(12) United States Patent
Beutin et al.

(10) Patent No.: US 11,059,597 B2
(45) Date of Patent: Jul. 13, 2021

(54) AIRCRAFT WITH MULTIPLE FAN PROPULSION ASSEMBLY FIXED UNDER THE WING

(71) Applicant: SAFRAN AIRCRAFT ENGINES, Paris (FR)

(72) Inventors: Bruno Albert Beutin, Moissy-Cramayel (FR); Nicolas Maurice Herve Aussedat, Moissy-Cramayel (FR); Nicolas Alain Bader, Moissy-Cramayel (FR); Philippe Gerard Chanez, Moissy-Cramayel (FR); Gilles Alain Charier, Moissy-Cramayel (FR); Mathieu Lallia, Moissy-Cramayel (FR); Lionel Jean Leon Lefranc, Moissy-Cramayel (FR); Kevin Morgane Lemarchand, Moissy-Cramayel (FR); Herve Jean Albert Mouton, Moissy-Cramayel (FR); Nicolas Joseph Sirvin, Moissy-Cramayel (FR); Ludovic Michael Laurent Toupet, Moissy-Cramayel (FR); Christian Sylvain Vessot, Moissy-Cramayel (FR); Nathalie Nowakowski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 492 days.

(21) Appl. No.: 15/765,469

(22) PCT Filed: Sep. 29, 2016

(86) PCT No.: PCT/FR2016/052469
§ 371 (c)(1),
(2) Date: Apr. 2, 2018

(87) PCT Pub. No.: WO2017/060585
PCT Pub. Date: Apr. 13, 2017

(65) Prior Publication Data
US 2018/0281978 A1    Oct. 4, 2018

(30) Foreign Application Priority Data

Oct. 5, 2015   (FR) ...................................... 1559454

(51) Int. Cl.
*B64D 27/12*    (2006.01)
*B64D 27/26*    (2006.01)
(Continued)

(52) U.S. Cl.
CPC .............. *B64D 27/12* (2013.01); *B64C 3/185* (2013.01); *B64C 3/32* (2013.01); *B64D 27/26* (2013.01);
(Continued)

(58) Field of Classification Search
CPC ........... B64C 3/32; B64C 3/185; B64D 27/00; B64D 27/02; B64D 27/12; B64D 27/18;
(Continued)

(56) References Cited

U.S. PATENT DOCUMENTS 3,054,577 A  *  9/1962  Wolf ...................... F02K 3/062
                                                    60/226.1
3,229,933 A  *  1/1966  Kutney ............... B64C 29/0016
                                                    244/55

(Continued)

FOREIGN PATENT DOCUMENTS

| EP | 2096293 | 9/2009 |
|---|---|---|
| EP | 2572986 | 3/2013 |
| GB | 2447738 | 9/2008 |

OTHER PUBLICATIONS

Safran Aircraft Engines, "International Search Report," PCT Application No. PCT/FR2016/052469 (dated Dec. 14, 2016).

Primary Examiner — Richard R. Green
Assistant Examiner — Michael A. Fabula
(74) Attorney, Agent, or Firm — Womble Bond Dickinson (US) LLP

(57) ABSTRACT

An aircraft including a fuselage, a lateral support wing (1) and a propulsion assembly (100) mounted under the wing. The wing includes at least two structural spars (11ba, 11bf) extending from the fuselage toward the tip of the wing, one of these (11ba) being upstream and the other (11bf) downstream. The propulsion assembly includes a gas generator (106) and at least two offset fans (102, 104) arranged on either side of the axis of the gas generator. The offset fans (102, 104) are attached directly to one of the spars (11ba, 11bf) and the gas generator (106) is attached directly to the two spars. The leading edge of the wing forms a given sweep of angle ($\alpha$) with the axis of the fuselage. The two offset fans (102, 104) are axially offset from one another.

11 Claims, 4 Drawing Sheets

(51) Int. Cl.

| | |
|---|---|
| *B64D 35/04* | (2006.01) |
| *F02C 3/107* | (2006.01) |
| *F02K 3/077* | (2006.01) |
| *F02C 7/20* | (2006.01) |
| *B64C 3/18* | (2006.01) |
| *B64C 3/32* | (2006.01) |
| *B64D 33/02* | (2006.01) |
| *B64D 33/04* | (2006.01) |
| *F02C 7/04* | (2006.01) |
| *F02K 1/52* | (2006.01) |

(52) U.S. Cl.
CPC ............. *B64D 33/02* (2013.01); *B64D 33/04* (2013.01); *B64D 35/04* (2013.01); *F02C 3/107* (2013.01); *F02C 7/04* (2013.01); *F02C 7/20* (2013.01); *F02K 1/52* (2013.01); *F02K 3/077* (2013.01); *B64D 2027/266* (2013.01); *B64D 2033/0273* (2013.01); *F05D 2220/323* (2013.01); *F05D 2250/312* (2013.01); *Y02T 50/60* (2013.01)

(58) Field of Classification Search
CPC ........ B64D 27/20; B64D 27/26; B64D 29/00; B64D 29/02; B64D 29/06; B64D 33/00; B64D 33/02; B64D 33/04; B64D 2027/026; B64D 2033/0266; B64D 2033/0273; B64D 2033/0286; F02C 7/05; F02C 7/20; F02K 1/52; F02K 3/06
See application file for complete search history.

(56) References Cited

U.S. PATENT DOCUMENTS

| | | | | |
|---|---|---|---|---|
| 3,618,875 | A * | 11/1971 | Kappus | B64C 29/0025 244/12.3 |
| 4,209,149 | A | 6/1980 | Morris et al. | |
| 4,449,681 | A * | 5/1984 | Gratzer | B64D 29/02 244/130 |
| 4,449,682 | A * | 5/1984 | Gratzer | B64D 29/02 244/130 |
| 4,506,850 | A * | 3/1985 | McConnell | B64D 29/08 244/110 B |
| 7,850,116 | B2 * | 12/2010 | Stuhr | B64D 27/12 244/54 |
| 8,015,796 | B2 * | 9/2011 | Babu | F01D 13/003 60/226.1 |
| 9,297,270 | B2 * | 3/2016 | Suciu | F01D 15/12 |
| 10,450,079 | B2 * | 10/2019 | Beutin | B64C 3/32 |
| 10,518,890 | B2 * | 12/2019 | Chanez | B64D 27/18 |
| 2004/0025493 | A1 * | 2/2004 | Wojciechowski | F02K 3/077 60/224 |
| 2007/0272796 | A1 | 11/2007 | Stuhr | |
| 2009/0229243 | A1 * | 9/2009 | Guemmer | F02K 3/077 60/226.1 |
| 2010/0011741 | A1 * | 1/2010 | Babu | F02C 7/36 60/226.1 |
| 2011/0240804 | A1 | 10/2011 | Kehayas | |
| 2014/0117152 | A1 * | 5/2014 | Suciu | F02C 7/36 244/54 |
| 2016/0144967 | A1 * | 5/2016 | Golshany | B64C 11/001 244/54 |
| 2016/0229545 | A1 * | 8/2016 | Pautis | B64C 3/187 |
| 2017/0240286 | A1 * | 8/2017 | Lemarchand | B64D 27/12 |

* cited by examiner

AIRCRAFT WITH MULTIPLE FAN PROPULSION ASSEMBLY FIXED UNDER THE WING

FIELD OF THE INVENTION

The present invention relates to the aeronautical field and in particular an aircraft equipped with at least one powerplant formed from a gas generator and at least two fans, the powerplant being fixed under the wing of the aircraft.

PRIOR ART

The natural evolution of multiflow turbojets having a fan, notably upstream, is to reduce the specific thrust by increasing the by-pass ratio, which is the ratio of the secondary flow to the primary flow. In the case of conventional twin-body engines with twin flow with a turbine connected to the fan directly, any increases in by-pass ratio are notably limited by the difficulty in reconciling the necessary slowing of the rotary speed of the fan and the effect of such slowing on the increase in load and the degradation of performance of the low-pressure turbine. The architectures of the types known by the name of GTF, which is the acronym of "geared turbofans", and UHBR, "ultrahigh bypass ratio", in which the fan rotor is driven via a speed reducer, partially achieve this objective by optimizing the efficiency of the turbine while allowing moderate fan operating conditions.

However, independently of this objective of optimizing the efficiencies of internal components of the turbine engine, further increase in the by-pass ratio on such engines attached under the wing would be constrained by the minimum ground clearance to be respected, the by-pass ratio being linked to the fan diameter.

Moreover, ever increasing fan diameters, leading to lower and lower rotary speeds, would increase the complexity of the architecture of power transmission—because of the increase in the reduction ratio of the reduction gearing—and would have an effect on engine weights that is not negligible.

A solution consisting of using an engine with several offset fans in an installation of the powerplant under the wing would make it possible to increase their by-pass ratio while maintaining a suitable ground clearance for the aircraft. FIG. 1 shows the conventional mounting of a powerplant of this kind.

Documents U.S. Pat. No. 3,054,577 and EP 2 096 293 also present examples of fans offset relative to the gas generator. There is also, for example in document U.S. Pat. No. 4,209,149, the case of several gas generators with an upstream fan arranged under the wing by means of a strut.

However, the architectures of this type of powerplant involve a certain number of constraints on the drag, weight and ground clearance, which must be resolved:

With a powerplant consisting of two offset fans on either side of the gas generator, the whole assembly positioned under the wing upstream of the latter tends to amplify the drag effects induced by the engine pod. The consequence is a degradation of engine performance.

Furthermore, the conventional arrangement of the powerplant under the wing, upstream of the latter, involves a means of suspension with the aim of taking up the stresses from this powerplant to the wing. A conventional strut is then used. It is positioned between the two fans. The positioning of the centre of gravity displaced upstream relative to a conventional powerplant gives rise to a considerable weight effect on the strut and prevents performance optimization of the engine assembly. Moreover, the strut is not generally designed for withstanding the asymmetric stresses from the two fans, for example when one of the two mechanisms for thrust reversal has failed. A design resistant to asymmetric stresses would involve considerable reinforcement of the structure and therefore a substantial increase in weight; this therefore imposes constraints on the entire architecture, for which the weight or the reliability is still affected.

Moreover, if we take into account the opening of the trailing edge flaps of the wing, positioning the gas generator high up presents a risk of aerodynamic disturbance. In order to solve this problem, the gas generator is arranged low enough, with the fans low down, which affects the aircraft's ground clearance.

As the weight of the strut, as in document EP 2 572 986, as well as the drag of the engine pod are strong constraints on these concepts, alternative solutions more integrated in the wing have been proposed in the prior art.

A solution known from the prior art is for the powerplant to be more integrated in the wing. Document U.S. Pat. No. 3,054,577, referring to FIG. 4 of said document, describes a powerplant whose gas generator is partly integrated in the wing. The powerplant comprises two fans offset on each side of the gas generator, each of which is attached to a housing of the gas generator, according to said FIG. 4, which is very schematic, and the description thereof in the document. A problem resulting from this arrangement is that depending on the dynamic stresses acting on the wing in flight or even while taxiing, the accelerations that the powerplant undergoes, in particular in the vertical direction, may cause a simultaneous beating motion of the two fans, which makes the angular position of each fan oscillate relative to its angular position at rest with respect to the axis of the gas generator. The transmission shaft between the gas generator and a fan, which extends radially relative to the axis of the gas generator, follows the beating of the fan, which induces mechanical stresses on the transmission mechanisms between the axial shafts of the gas generator and fan and the radial transmission shaft. These mechanical stresses generally cause accelerated wear of the gear teeth of the transmission mechanisms, or breakage.

It is therefore desirable to provide a solution that would make it possible to reduce the beating motion of the two fans significantly.

Moreover, it is necessary to pay attention to the phenomenon of aerodynamic disturbance between the wing and the engine pod when the two offset fans are in a common plane, i.e. the air intakes of the two fans are at the same axial level in the longitudinal direction of the powerplant.

A sweptback wing geometry is common for airliners. This sweepback, of about 30°, in the case of fans positioned in the same plane, prevents an equitable distribution of the flow between the inner and outer fans. In fact, the inner fan becomes masked when it is decided to position a powerplant completely under the wing.

The invention aims to rectify these problems.

DESCRIPTION OF THE INVENTION

The intended aim is achieved with an aircraft comprising a fuselage, a lateral lifting wing and a powerplant mounted under the wing, the wing comprising at least two structural spars extending from the fuselage towards the tip of the wing, one upstream and the other downstream, and the powerplant comprising a gas generator and at least two offset fans arranged on either side of the axis of the gas generator.

According to the invention, this aircraft is characterized in that the offset fans are attached directly to one of the spars and the gas generator is attached directly to both spars.

This feature notably solves the problem of weight distribution in the axial direction and it avoids the use of a strut that might generate aerodynamic forces during manoeuvres, which are a source of instability. More particularly, the powerplant is more integrated in the wing and the surfaces contributing to drag are minimized by said configuration.

Thus, the expression "directly attached" means that the powerplant, the gas generator and the fans are fixed without struts so that the powerplant is more integrated under the wing.

More particularly, the offset fans are attached to the upstream spar.

According to another feature, each fan comprises a housing supported by the upstream spar via a suspension device that connects the housing directly to said upstream spar.

According to another feature, with the leading edge of the wing forming a sweepback of a given angle with the axis of the fuselage, the two offset fans are displaced axially relative to one another.

More particularly, the air intakes of the two offset fans are under and close to the leading edge of the wing.

Insofar as the leading edge forms an angle that is not negligible relative to the perpendicular to the axis of the fuselage, it appears that the arrangement of the powerplant in its conventional form, in which the inner offset fan, located alongside the fuselage, is likely to generate disturbances of an aerodynamic origin affecting fan efficiency. Such an arrangement allows an equitable distribution of flow between the inner fans (near the fuselage) and outer fans (near the wing tip). The inner fan is then less masked owing to its arrangement under the wing. The aerodynamic disturbances between the pod of the fans and the wing are minimized, notably at high angles of attack.

Bringing the fan intake closer to the leading edge also avoids the aerodynamic disturbances between the pod of the fans and the wing.

According to another feature, the axis of the gas generator is located at a higher level than the axes of the two offset fans.

According to a preferred embodiment, the gas generator is integral with the wing, an outer envelope of the gas generator being formed at least partly by a part of the wall forming the lower surface and/or the upper surface of the wing. More particularly, at least part of the envelope of at least one of the fans is formed by a part of the wall forming the lower surface and/or the upper surface of the wing.

In this embodiment, the gas generator comprises a gas ejector nozzle where the axis of the ejected gas stream forms a downward angle between 5 and 25° with the horizontal plane. This means that the gas stream does not interfere with the control flaps mounted on the trailing edge of the wing.

Another solution consists of arranging a channel for ejection of the gases from the gas generator so as to position the gas flow along the upper surface of the wing. This solution offers the advantage of creating a Coanda effect on the wing.

DESCRIPTION OF THE FIGURES

Other features and advantages will become clearer from the following description of embodiments of the invention, which are not limiting, referring to the appended drawings, in which.

DETAILED DESCRIPTION OF EMBODIMENTS OF THE INVENTION

Figure 1:
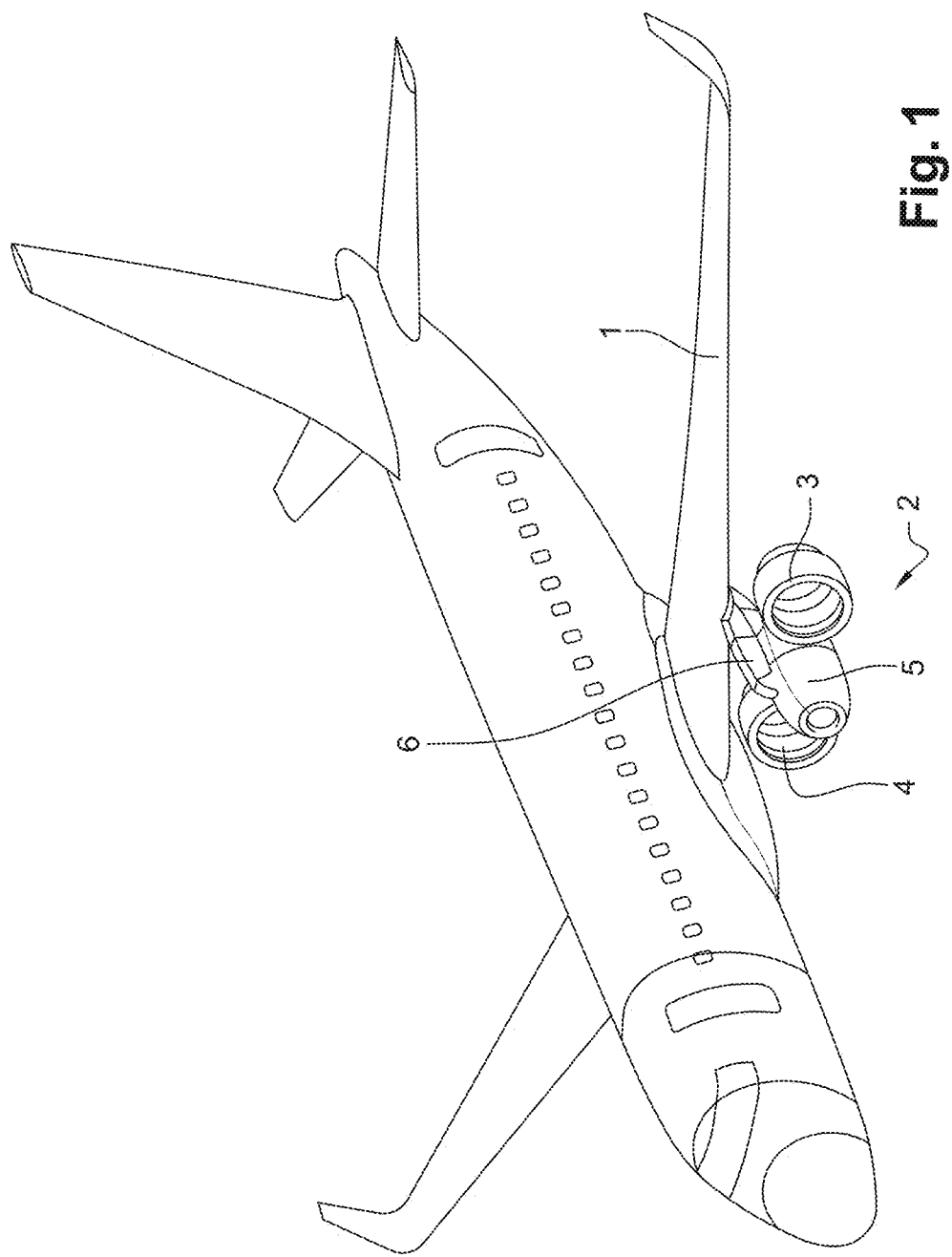
FIG. 1 shows an aircraft, on which a conventional powerplant with two upstream fans is mounted under the wing by means of a strut.

FIG. 1 shows an aircraft, in this case an aeroplane, with its fuselage and its two lateral lifting wings 1, under which powerplants 2 are mounted, for improving the specific consumption of the engines and the level of noise. A single powerplant 2 is shown in this figure, but a second one is provided under the other wing.

The powerplant 2 of this type, namely with two offset fans on either side of a gas generator, conventionally comprises a gas generator 5 flanked by two fans, 3 and 4, one on each side of the axis of the gas generator. Here, the axis of the gas generator is roughly parallel to the axis of the fuselage. The gas generator 5 is formed by a gas turbine engine with at least one air intake, a compressor, a combustion chamber and a turbine. It ends downstream with a gas ejector nozzle. It may be mono- or multiflow, single- or multi-body depending on requirements. The fans are driven either mechanically by a shaft of the gas generator via a suitable mechanical transmission mechanism, or by a gas stream taken from the gas generator. The manner of driving the fans does not form part of the subject matter of the present application. Its description is not developed further. The same applies to the connection between the fan modules and the gas generator. In FIG. 1 corresponding to the prior art, the powerplant is joined to the wing to which it is attached via a strut 6. The drawbacks of this mounting arrangement were mentioned above. In particular, mounting upstream relative to the wing tends to amplify the engine pod drag effects, and the weight has a considerable effect.

Figure 2:
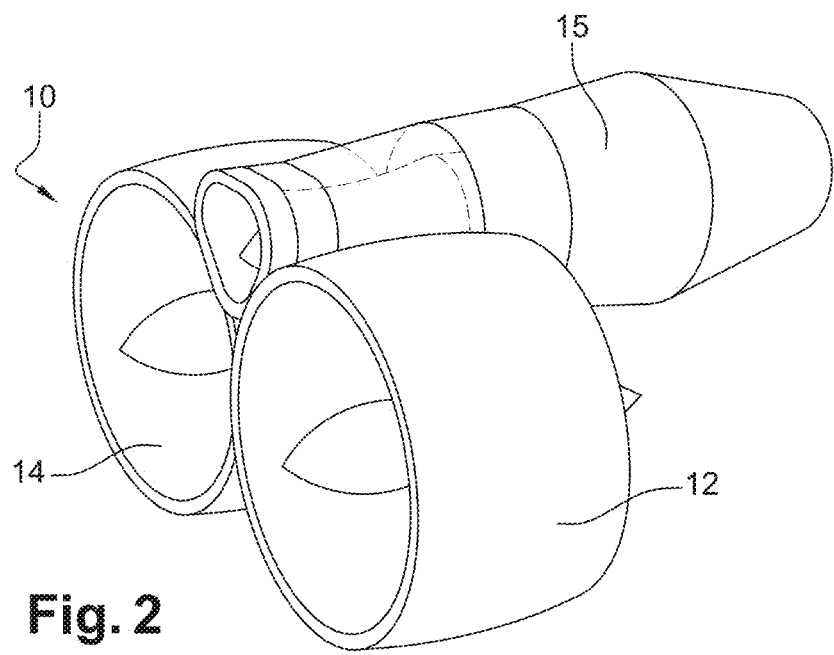
FIG. 2 shows a conventional powerplant with two upstream fans, which are offset relative to the axis of the gas generator.

FIG. 2 shows a single powerplant 10 that is developed relative to the solution in FIG. 1. The fans 12 and 14, of which only the housings are shown, which surround the fan rotors, which cannot be seen, and the central hubs are side by side. The gas generator 15 is arranged straddling the two fan housings and extends backwards, the front of the assembly being on the left-hand side relative to the figure. Once again, the means for driving the fans 12 and 14 by the gas generator 15 are not specified, nor are the means connecting them together. In this case the intake of the gas generator does not have a fan. In a variant embodiment with three fans, two of which are offset, a fan that is not offset may be arranged upstream of the gas generator concentrically with the latter.

Figure 3:
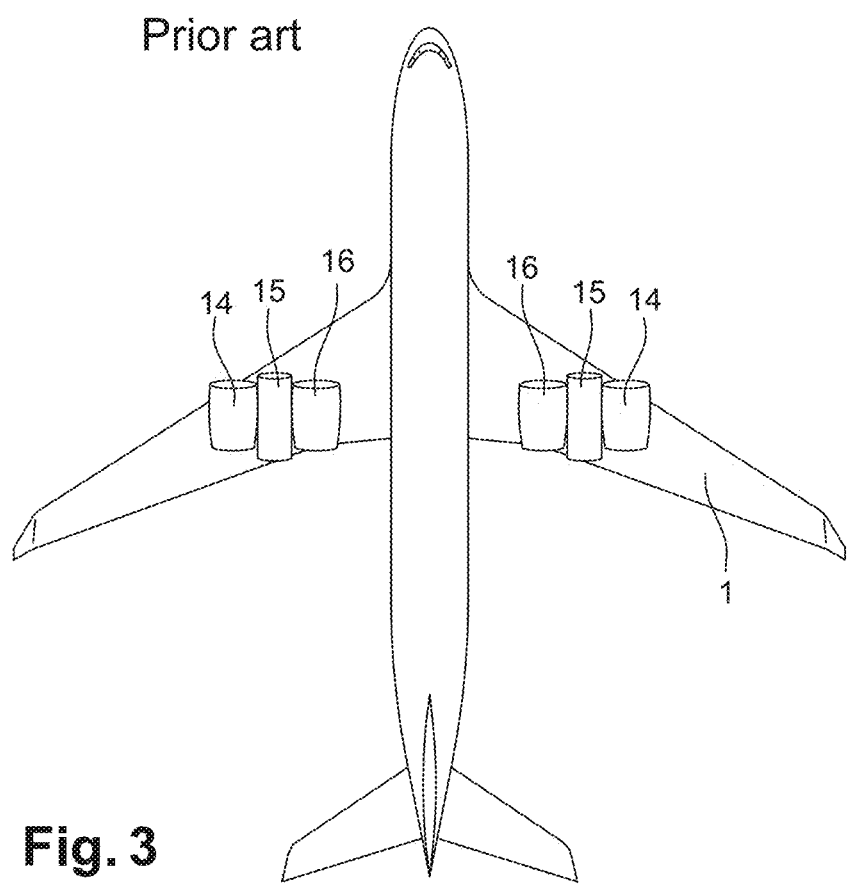
FIG. 3 shows the position of the conventional powerplant relative to the leading edge of the wing.

In FIG. 3, the powerplant is arranged under the wings of an aeroplane that have a sweepback, as is usual in the field of commercial aircraft, of the order of 30°. It can be seen that the fans 16, called inner because they are alongside the fuselage, are partly masked by the upstream edge of the wing, precisely owing to the sweepback angle of the wings. In the flight phases, for example when climbing, when the aeroplane is led to form an angle with its relative wind, this upstream zone is the site of strong disturbances in the flow of the airstream along the wings. These disturbances are detrimental to the proper operation of the engine.

This problem is corrected, according to the invention, by optimizing the integration of the powerplant relative to the wing so as to minimize the surfaces contributing to drag. This is achieved by fixing the powerplant 100 directly to the wing spars without an intervening strut. Thus, the term "directly" is used to mean that a strut is not used for suspending the powerplant on the wing spars.

Figure 4:
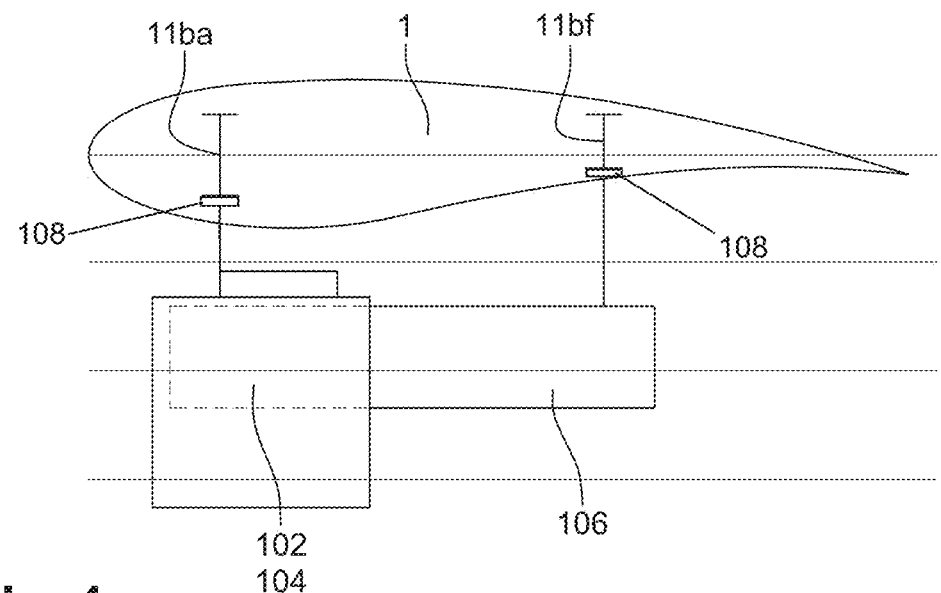
FIG. 4 shows a schematic cross-section of the wing with powerplant attachment according to the invention.

FIG. 4 shows, in section, the wing 1 and its two spars, one upstream 11ba and the other downstream 11bf. Upstream and downstream are defined relative to the direction of travel of the aeroplane. The powerplant 100 comprises two fans 102 and 104 as well as the gas generator 106. The whole assembly is attached directly to the wing spars. The two fans are fixed directly to the upstream spar 11ba near the leading edge of the wing; the gas generator 106 is attached directly to both spars 11ba and 11bf. The attaching means are not described in more detail; they are within the capability of a person skilled in the art. The housing of a fan is a structural stator element, inside which the fan rotor is mounted. "Fan fixed directly to a spar" means that the fan housing is supported by the spar via a suspension device 108 that connects the housing directly to the spar, i.e. without a structure such as a strut or similar mast being interposed in the path of forces between the housing and the spar. The suspension device 108, which is shown schematically, may be similar to a conventional suspension device joining a turbine engine housing to a strut.

Each of the two fans is essentially supported by the upstream spar 11ba. A linkage joining the housing of a fan to the housing of the gas generator, which may incorporate a passage for the transmission shaft of the gas generator to the fan, may be designed for supporting a small part of the weight of the fan. Nevertheless, the largest part of the weight of each fan is supported by the upstream spar, which makes it possible to limit considerably or even avoid completely the phenomenon encountered in the prior art, of the appearance of a simultaneous beating motion of the two fans in certain conditions.

Figure 6:
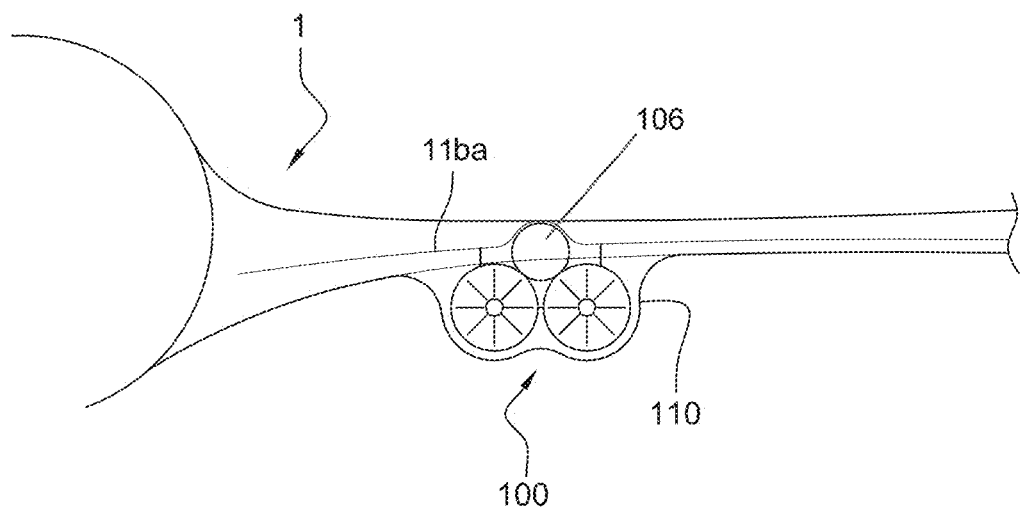
FIG. 6 shows schematically the arrangement of a powerplant under the wing with envelope.

If applicable, the drag produced by the engine is further minimized by incorporating at least part of the powerplant in the wing, as for example in the embodiment described hereunder with reference to FIG. 6.

Figure 5:
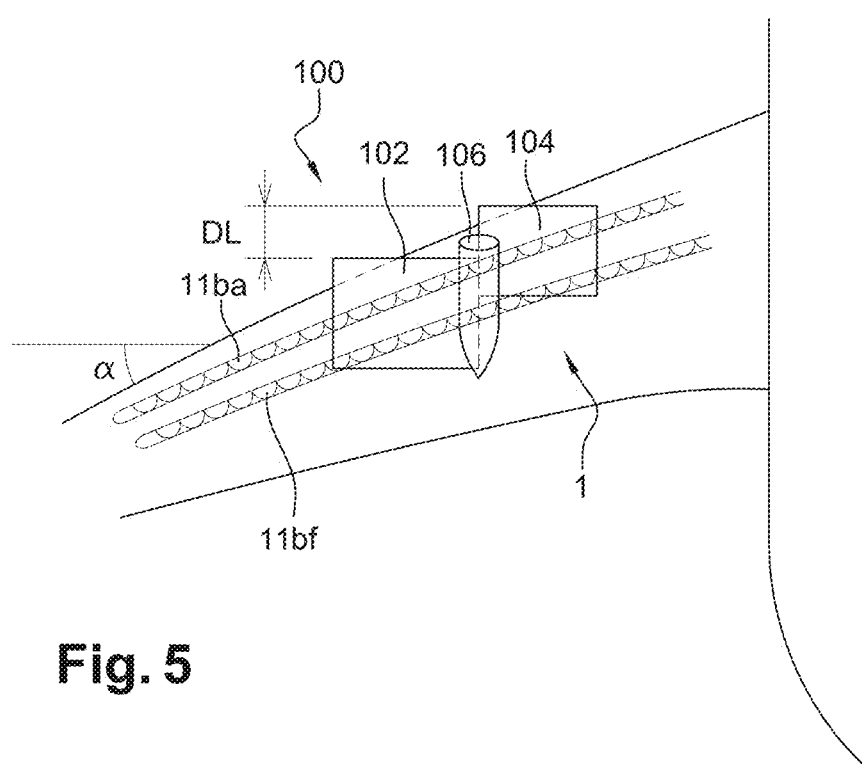
FIG. 5 shows the axially displaced arrangement of the offset fans so that they are located near the leading edge.

The second feature of the solution of the invention is illustrated in FIG. 5. With the wing 1 generally forming a sweepback of angle α (alpha) of the order of 30°, the two fans of the engine 100 are arranged with axial offset relative to one another. The outer fan 102 is displaced relative to fan 104, which is located alongside the fuselage. More precisely, it can be seen that the inner fan 104 is farther upstream than the outer fan 102. This axial difference makes it possible to arrange the engine under the wing while being as close as possible to the leading edge, favouring compact installation without overhang and allowing shrouding of the powerplant to reduce aerodynamic drag.

FIG. 6 illustrates the aspect of the invention that aims to minimize the drag produced by the engine, in an embodiment in which the powerplant 100 is integrated in an envelope I forming a pod 110 that forms part of the surface of the wing, here the lower surface of the wing. At least the upstream spar 11ba out of the two wing spars has a curvilinear portion forming a concavity directed downwards. In this way, the gas generator 106 is integrated at least partially in the wing while still being attached directly to the two spars, and more particularly suspended from the spars. According to other variants, only the gas generator is integrated in the wing and its envelope forms part of the lower surface and/or upper surface of the wing.

Figure 7:
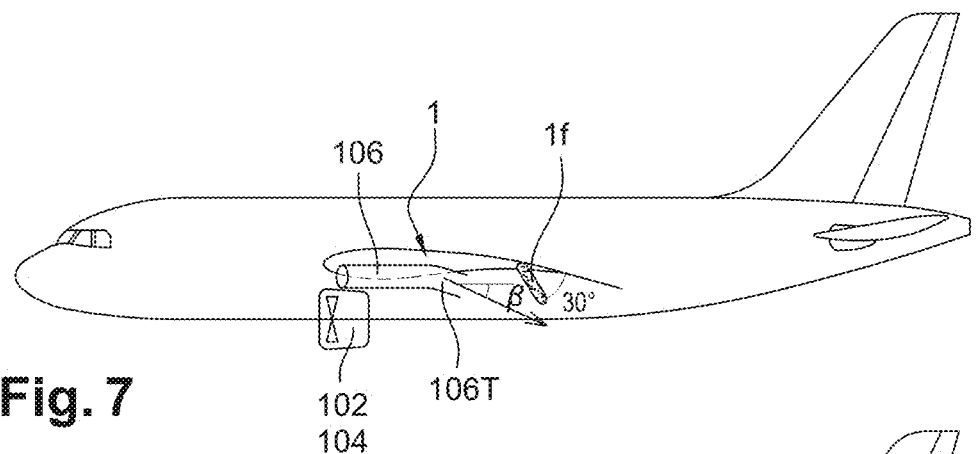
FIG. 7 shows schematically a side view of one embodiment of the orientation of the gas jet from the powerplant.

FIG. 7 shows a side view of the engine 100 with one of the fans, and with the gas generator 106 mounted close to the lower surface of the wing 1. It can be seen that the downstream edge of the wing is provided with flaps 1f, movable about a horizontal axis, perpendicular to the axis of the fuselage, as is known. To prevent the stream of gas from the gas generator 106 interfering with the plane of the flaps 1f when the latter are in the active position, it is specified in this variant embodiment that the exhaust gases are inclined downwards by an angle β of the order of 10 to 20°. The nozzle 106T for ejection of the gases from the generator 106 is also oriented downwards at said angle β.

Figure 8:
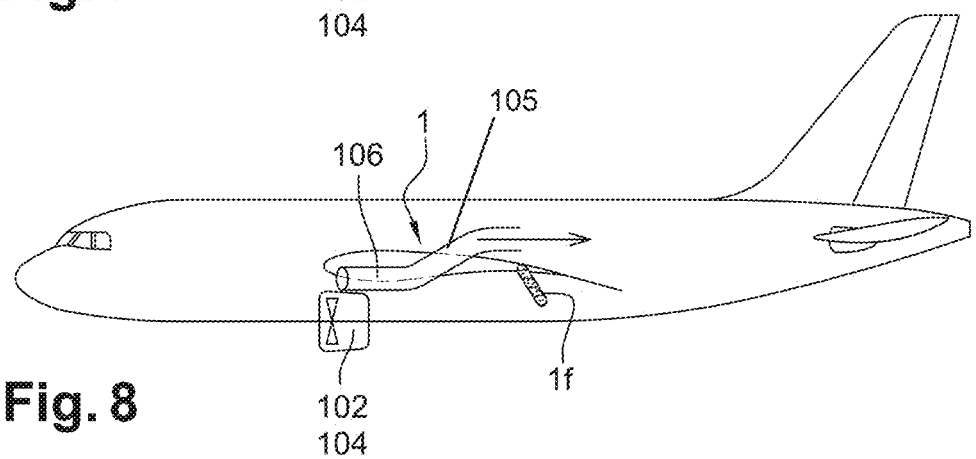
FIG. 8 shows schematically a side view of a variant of guidance of the gas stream from the powerplant.

In FIG. 8, the exhaust gases from the gas generator are deflected so that they sweep over the upper face of the wing 1, creating a Coanda effect and improving the lift of the wing. The gas generator 106 is in this case provided with a gas ejection channel 105 passing through the wing and opening parallel to the upper surface of the wing. In particular, the air intake of the gas generator is located under the wing and the gas jet nozzle is located above the wing. In this example, the ejection channel is of approximately S-shaped section.

The invention claimed is:

1. An aircraft comprising
a fuselage,
a lateral lifting wing, and
a powerplant mounted under the wing,
wherein the wing comprises at least two structural spars extending from the fuselage towards the tip of the wing, one of said at least two structural spars being upstream in a flight direction and another one of said at least two structural spars being downstream,
wherein the powerplant comprises a gas generator having a first longitudinal axis and at least two offset fans, one of said at least two offset fans being arranged on a first side of a vertical plane extending along the first axis and another one of said at least two offset fans being arranged on a second side of the vertical plane,
wherein the at least two offset fans are attached directly to one of said at least two structural spars and the gas generator is attached directly to each of said at least two structural spars,
wherein each of said at least two offset fans comprises an air intake, each air intake is under and close to a leading edge of the wing, and
wherein the intake of at least one offset fan is further upstream relative to the intake of another one of the at least two offset fans along the first axis.

2. The aircraft according to claim 1, wherein each of the at least two offset fans are attached to the upstream spar.

3. The aircraft according to claim 2, wherein each of said at least two offset fans comprises a housing supported by the upstream spar via a suspension device connecting the housing to said upstream spar directly.

4. The aircraft according to claim 1, wherein the lateral lifting wing comprising the leading edge which forms a sweepback of a given angle (a) with a longitudinal axis of the fuselage.

5. The aircraft according to claim 1, wherein each of the at least two offset fans comprises a longitudinal axis, wherein the first axis of the gas generator is located higher than the longitudinal axes of the at least two offset fans.

6. The aircraft according to claim 1, wherein the gas generator is integral with the wing, and wherein an outer envelope of the gas generator is formed at least partly by a part of a wall forming a lower surface and/or an upper surface of the wing.

7. The aircraft according to claim 6, wherein at least part of an envelope of at least one of the at least two offset fans is formed by a part of a wall forming a lower surface and/or an upper surface of the wing.

8. The aircraft according to claim 1, wherein the gas generator comprises a gas ejection nozzle, and, wherein an axis of an ejected gas stream forms an angle ($\beta$) between 5 and 25° downwards with a horizontal plane.

9. The aircraft according to claim 1, wherein the gas generator comprises a gas ejection channel directing a gas flow along an upper surface of the wing.

10. The aircraft according to claim 1, wherein each of the at least two structural spars is formed in one piece.

11. The aircraft according to claim 1, wherein the powerplant is suspended from at least one of said at least two structural spars.

* * * * *